106. COMPOSITIONS, COATING OR PLASTIC.

Patented Mar. 13, 1934

1,951,186

UNITED STATES PATENT OFFICE 1,951,186

HARDENING AND WATERPROOFING COMPOUND FOR CEMENT AND CONCRETE MIXTURES

Richard E. A. De Bow, Bradley Beach, N. J., assignor to Acqua-Pruf, Inc., Newark, N. J., a corporation of New Jersey No Drawing. Application December 10, 1929, Serial No. 413,142. Renewed August 1, 1933

9 Claims. (Cl. 106—27)

This invention relates to cement compositions and indurating compositions for cements and a method of preparing the same; more particularly, to cement and concrete mixtures and a composition for enhancing the properties of concrete and cement mixtures.

It is an object of my invention to provide concrete and cement mixtures which will harden to obtain compressive strengths far in excess of concrete and cement mixtures now being produced and to provide an indurating composition for concrete and cement mixtures which will enhance the workable properties of the concrete and cement mixtures to obtain mixtures having a high order of flowability and, in addition, permit workability at temperatures including sub-freezing, without danger of affecting the final strength and density or speed of set and hardening of the concrete and cement mixtures.

Still more particularly, it is contemplated by my invention to provide a composition which may be added to concrete and cement mixtures in a facile manner and which will increase the compressive strength of the composition, accelerate the time of set and hardening, waterproof and densify the final product, without detracting from the workable qualities of the concrete and cement mixtures, but, in addition, permitting workability at sub-freezing temperatures, even with increased fluidity of the mixture when pouring into forms or molds for structural or other purposes.

Other objects of my invention reside in the provision of a marketable composition which may be economically and facilely added to concrete batches, to add thereto the properties above enumerated and to a new and novel method of preparing the same.

It is contemplated by my invention to provide an indurating composition for cement and concrete mixtures, characterized by adding to the water used in making concrete and cement mixtures a saline mixture which will decrease the time of setting and hardening of cement or concrete by adding thereto a solution of an alkaline earth metal chloride, such as calcium chloride, and to overcome any tendencies of this component to render the cement and concrete mixtures short when the concrete or cement is poured into position in construction work, as by pouring into molds or otherwise. This I accomplish by the addition of an agent which will, as far as possible, preserve the colloidal state of the batch of concrete or cement and which, by reason of the use of the calcium chloride, may tend to cause separation or segregation of the elements. For this purpose, in addition to the solution of calcium chloride, there is included a solution of tannin. This I have found, particularly with the ingredients hereafter referred to, will increase the workable properties above referred to and, in addition, change soluble adulterants in the water, sand and aggregate, to void filling insoluble precipitates in the final product.

As densification and waterproofness are also desirable objects of my invention, I may include, in addition to the calcium chloride and tannin, impalpable filling materials which will render the final concrete and cement products impervious and particularly form an impervious coating in the final product. For this purpose, I have found that impalpable fillers, such as lampblack and venetian red serve admirably for this purpose. These agents are particularly useful, also, where a distinctive tint is to be given to the concrete or cement mixture and when used for this purpose, their addition, particularly in connection with the tanning solution, assures an even and uniform distribution, without separation. This combination I find particularly valuable, not only in the final cement and concrete product, but in the marketable intermediate product which may be added to the water used for making up the cement and concrete batches. Thus, I have found that I may prepare an aqueous preparation including calcium chloride, to which the agents such as lampblack and venetian red may be added and by including a solution of tannin thereto, the product may be put on the market without undesirable separation of the solid components, such as lampblack and venetian red.

In addition to the filler value of venetian red and lampblack, which serves as a check on the honest addition of my compound to the cement batch, the impalpable fillers, particularly those specified, serve to augment the workability of the batch and acts as a lubricant for the coarser aggregate, facilitating densification of the mass. The increase of fluidity and workability further eliminates the careless drowning of the cement batch by workers and assures a proper proportioning of the batch for a dense product.

For further augmenting the property of the cement product and to compensate for the extreme solubility of the calcium chloride and the lime constituent which may be present in the cement, I include a silicious content comprising amorphous silica in the form of infusorial earth and sodium silicate. These ingredients are preferably both included in my indurating composition and when present in the final product, increase the waterproof characteristics of the entire cement product, overcome any undesirable characteristics which may be added to the product by including calcium chloride and other free lime present in the cement, facilitating the formation of the complex aluminum silicates, both from the cement products utilized and as a result of the presence of the components themselves in the indurating composition. The product as a whole, by the ingredients utilized, tends to react with any ingredients in the cement aggregate or water (such as free lime and magnesia) which would ordinarily cause the unsightly growth of efflorescence and minimizes its formation, if not wholly eliminating the same.

It will thus be observed that my preferred composition for indurating purposes, to be added preferably to a Portland cement batch, comprises an aqueous mixture of tannin, calcium chloride and sodium silicate, in connection with amorphous silica, such as infusorial earth and impalpable fillers, such as lampblack and venetian red.

As it is contemplated by my invention to provide a marketable product to be added to cement products with greatest facility, as when making up the concrete batch, it is preferred that my product be in the form which may be readily added to the water batch of the cement product. For this purpose my indurating composition is preferably prepared as follows—

There are first prepared the following batches—

(1) A solution of calcium chloride in water constituting a 26% solution of 77–80 flake calcium chloride in water. It is preferred that this solution have a specific gravity of 1.250, taken at the time when the batch is first prepared, the temperature being from about 150 to 170° F., due to the heat of solution. It will be observed that though this concentration is the preferred for my purposes, particularly in connection with the preferred proportions hereinafter set forth, for certain purposes the concentration of the calcium chloride solution may be varied so as to obtain a specific gravity varying from 1.5 to 1.1.

(2) A solution of technical tannin and water is made comprising a volume of tannin to a volume of water. To this is added lampblack and venetian red in proportions varying from 1/20 to 1/8 volume of lampblack and 1/10 to 1/4 volume of venetian red. Where a distinctive color is desired, these ingredients are varied within the range noted to obtain a bluish-purple or plum color.

(3) A dilute solution of sodium silicate is formed and to this is added amorphous silica, preferably in the form of infusorial earth. The sodium silicate solution and the infusorial earth are mixed volume for volume. There are then additionally added twelve volumes of water. Although it is prefered that the sodium silicate and amorphous silica be added volume for volume, a variation of 25% above or below the equal quantities specified may be made so that I may have a 50-50 mixture by volume of these ingredients or approximately 65 parts of one to 35 parts of the other ingredient, or vice versa. The water quantity, however, for these combined ingredients should be within close limits of the amount specified. The concentration of sodium silicate is that obtained in the form of N brand of the Philadelphia Quartz Co. and this constitutes a 41° Baumé solution of sodium silicate containing approximately 8.9% $Na_2O$ and 29.0% $(SiO)_2$.

Twelve ounces each of the mixtures prepared in Nos. 2 and 3 are added to a sufficient quantity of the calcium chloride solution, as prepared in batch No. 1, to constitute five gallons, this amounting to approximately 2% each of mixtures 2 and 3, the order of addition being preferably first to add No. 3 and then to add No. 2.

As an alternative of the above method of mixing the ingredients, the twelve ounces each of batches Nos. 2 and 3 are first mixed together before addition to the calcium chloride solution is made, constituting batch No. 1. This will make a mixture of approximately 96% of No. 1 and 4% combined Nos. 2 and 3 mixtures.

By the order of addition as specified, the solution may be immediately packaged in suitable containers and sealed, without the formation of objectionable bubbles and when so added, particularly combined by vigorous agitation of a mixing machine, the ingredients which do not go into solution, such as lampblack, venetian red and infusorial earth, will be suspended and maintain a uniform composition throughout prolonged periods of storage, requiring no objectionable amount of stirring or mixing when ready for use.

It will be observed further that it is preferred that the calcium chloride solution as utilized above be clarified and this may be obtained by allowing the calcium chloride solution as above prepared to stand for about two hours in a settling tub, which includes a draining faucet about an inch or so from the bottom, with suitable provision to clear out the sediment at periods of time to assure the desirable clear solution of calcium chloride.

The product so prepared constitutes the preferred form of my indurating composition and for purposes of use in concrete mixtures, it may be added in proportions of one quart of this mixture to seventeen quarts of the water used in the cement or concrete batch. It is preferred to calculate my indurating composition, for best results, in the proportions of one quart of the mixture to each bag of the cement used in making up the concrete or cement batch, calculated upon 94 pounds of cement to the bag. This quantity may be increased where acceleration in set is desired and an addition of twice the quantity of indurating composition, to wit, two quarts of the mixture per bag of cement, will give approximately 50% greater acceleration in set, that is, whereas the addition of one quart of the mixture per bag of cement will cause the cement mixture to set in approximately three hours, two quarts of the mixture will cause this batch to set in approximately two hours. It will be observed that smaller amounts of the mixture may be added and there will be obtained proportionately decreased speeds of setting.

The quantity of the calcium chloride may be increased, for purposes of accelerating the speed of setting of the cement, up to a limit based upon absolute quantities of 3.3% of calcium chloride to the absolute quantity of cement. Increase of the quantity of the calcium chloride beyond this percentage will cause a general tapering off of the compressive strength of the resultant cement matrix.

The indurating composition as above provided, when added to cement mixtures, including concrete, will be strengthened to the extent of producing a compressive strength averaging 200 pounds per square inch in excess of untreated concrete. This will be obtained in addition to the acceleration of the speed of setting and of hardening of the concrete, for instance, final hardening will be accelerated to be obtained in two days as compared with seven days in ordinary untreated concrete. When mixed with the water necessary for preparing the concrete, the concrete mixtures may be worked at sub-normal temperatures and as low as 15° above zero F. without danger of freezing.

Though the calcium chloride accelerates the time of set and hardening, the ingredients used with this agent in my product will not undesirably affect the workability of the batch and, in fact, render the entire batch more flowable and prevents separation of the aggregate used in the concrete mixture. The material will flow into the mold much more readily.

The product also has the desirable properties, in addition to the strength above specified, of being exceedingly dense, not only of the physical characteristics of the cement product wherein the pores of the cement are filled, without any non-uniform separation of the impalpable fillers but reactions will occur tending to render insoluble the normally soluble constituents present. By the addition of the indurating composition, cement mortar may be troweled to a highly polished, glass like surface, impervious to the disintegrating effect of oils or dilute acids, of a character unattainable by untreated mortars.

The indurating composition additionally has the desirable characteristic of being readily marketable and may be added to the concrete batch with great facility and ease by being added to the water used in making up the cement mixtures.

Having thus described my invention and illustrated its use, what I claim as new and desire to secure by Letters Patent, is—

1. A cement composition comprising a cement mixture including calcium chloride, amorphous silica, sodium silicate and impalpable fillers suspended in an aqueous tannin solution.

2. A cement batch comprising cement and the requisite water, the water having added thereto for every one hundred pounds of the cement used, 1 to 2 quarts of an aqueous mixture comprising calcium chloride, tannin, infusorial earth and sodium silicate.

3. A cement batch including an indurating composition comprising an aqueous solution of calcium chloride of a specific gravity of 1.5 to 1.1, tannin, sodium silicate and impalpable fillers containing amorphous silica, lampblack and venetian red suspended therein.

4. A cement indurating and waterproofing composition comprising an aqueous solution of calcium chloride and a soluble silicate and having admixed therewith amorphous silica.

5. A cement indurating composition comprising an aqueous mixture of calcium chloride of a specific gravity of 1.5 to 1.1, approximately 2% of a mixture of tannin solution, lampblack and venetian red, and 2% of a 41° Baumé solution of sodium silicate including 35 to 65% of infusorial earth.

6. A cement indurating composition comprising an aqueous mixture of a 16% solution of calcium chloride, 2% of a 41° Baumé solution of sodium silicate including amorphous silica, and tannin admixed with impalpable fillers.

7. A cement indurating composition comprising an aqueous mixture of a 26% solution of calcium chloride, of which 2% is composed of a mixture of a 41° Baumé solution of sodium silicate including 35 to 65% infusorial earth and 2% composed of tannin solution mixed with impalpable fillers.

8. The method of making an indurating composition for cement mixtures which comprises adding to a calcium chloride solution a mixture of sodium silicate, infusorial earth and then tannin solution and impalpable fillers.

9. The method of making an indurating composition for cement mixtures which comprises adding to a calcium chloride solution a mixture of sodium silicate, infusorial earth, tannin, impalpable fillers and water.

RICHARD E. A. DE BOW.